M. J. QUINN.
PISTON PACKING.
APPLICATION FILED SEPT. 3, 1907.

902,168.

Patented Oct. 27, 1908.
2 SHEETS—SHEET 1.

Witnesses.

Inventor

M. J. QUINN.
PISTON PACKING.
APPLICATION FILED SEPT. 3, 1907.

902,168.

Patented Oct. 27, 1908.

2 SHEETS—SHEET 2.

Witnesses.

Inventor.

UNITED STATES PATENT OFFICE.

MARTIN J. QUINN, OF TORONTO, ONTARIO, CANADA, ASSIGNOR TO CLUFF BROTHERS, OF TORONTO, CANADA, A FIRM.

PISTON-PACKING.

No. 902,168.  Specification of Letters Patent.  Patented Oct. 27, 1908.

Application filed September 3, 1907. Serial No. 391,056.

*To all whom it may concern:*

Be it known that I, MARTIN JOSEPH QUINN, of the city of Toronto, in the county of York and Province of Ontario, Canada, have made new and useful Improvements in Piston-Packings, and do hereby declare that the following is a full, clear, and exact description of the same.

This invention relates to a packing means for pistons and the object of the invention is to arrange the packing so that the pressure in the cylinder will positively cause it to engage the inner surface of the cylinder in which the piston is moving.

In carrying out the invention the peripheral surface of the piston is formed with a circumferential channel, and to the peripheral surface of the piston above the circumferential channel is secured one edge of the packing, the other edge of the packing being free to move outwards from the piston and engage with the inner surface of the cylinder, and one channel or a series of channels communicating through the piston with the circumferential channel to provide for the flow of the pressure fluid to the latter, so that the pressure fluid will press the free edge of the packing into engagement with the inner surface of the cylinder.

For an understanding of the invention reference is to be had to the following description and to the accompanying drawings in which:—

Figure 1:
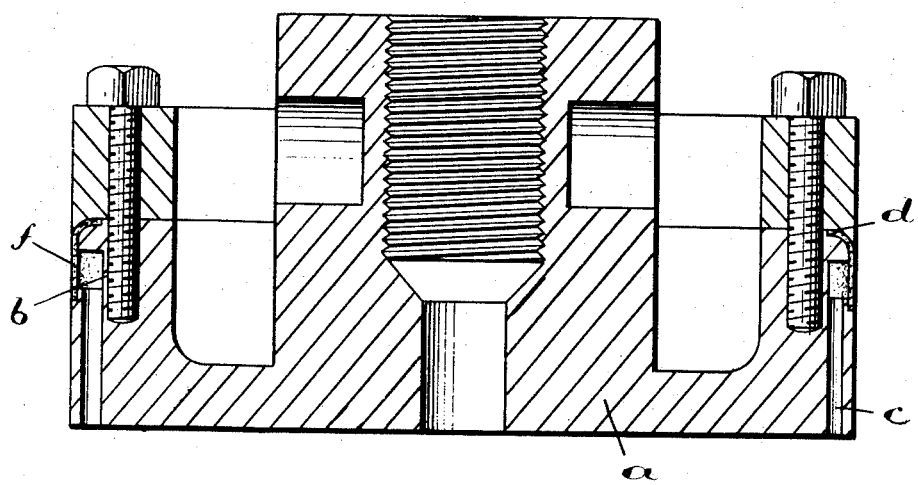
Figure 2:
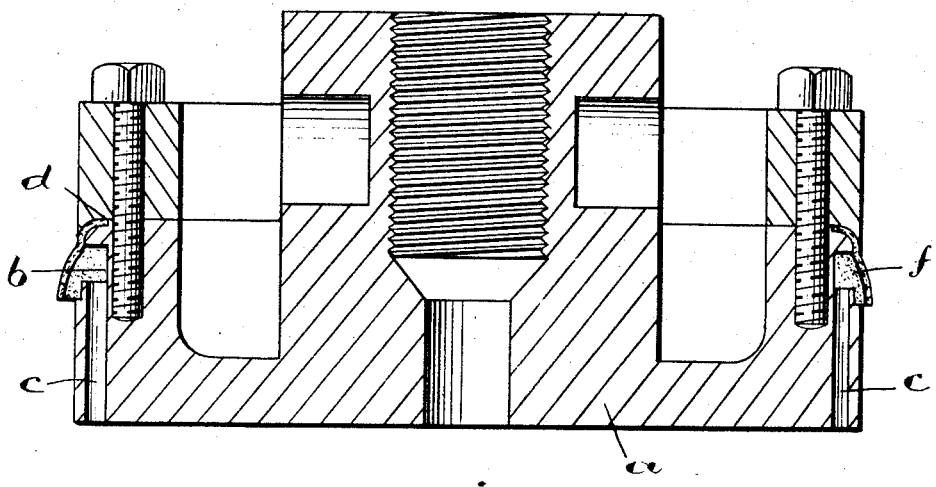
Figure 3:
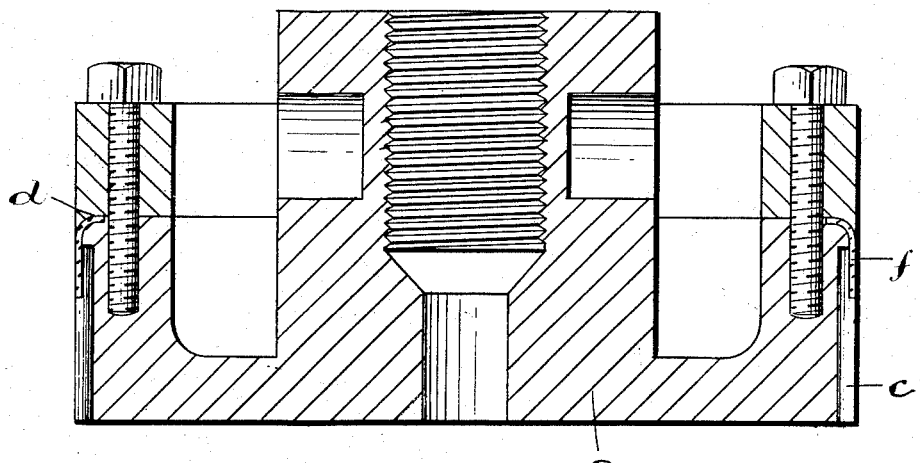
Figure 4:
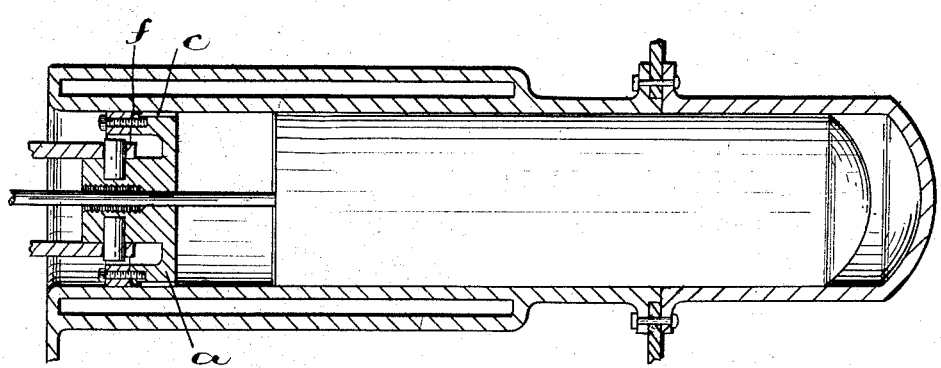

Figure 1, is a sectional view of a piston made in accordance with the present invention with the packing flat against its peripheral surface. Fig. 2, is a similar view to Fig. 1, showing, in an exaggerated form, the free edge of the packing pressed outwards from the piston. Fig. 3, is a view of a modification of the construction shown in Fig. 1. Fig. 4, is a vertical section of the cylinder of a hot air engine showing the application of the invention to a device of that character.

Like characters of reference refer to like parts throughout the specification and drawings.

In the peripheral surface of the piston $a$ is a circumferential channel $b$, and extending through the piston $a$ from the pressure side thereof and communicating with the circumferential channel $b$ is one channel or a series of channels $c$. Secured to the peripheral surface of the piston, beyond that side of the circumferential channel $b$ remote from the pressure side of the piston is the fixed edge $d$ of the packing $f$. As shown in Figs. 1 and 2 of the drawings the channels $c$ may be formed through the piston $a$ or as shown in Fig. 3 they may be formed in the peripheral surface of the piston, in either case the pressure fluid can enter behind the packing $f$ during the movement of the piston and press the packing against the inner surface of the cylinder.

The present invention is particularly designed for hot air engines, in which it is necessary to prevent leakage from the cylinder through the space between the piston and cylinder. In engines of this class it is necessary to loosely fit the piston in the cylinder so that there will be no risk of the friction of the parts or the expansion of the metal interrupting the action of the engine, and so that provision will be made for the admission of a limited volume of air into the cylinder through the space between the piston and the inner surface of the cylinder to prevent the formation of a vacuum in the latter, and it is necessary in such cases to provide the piston with a packing so arranged as to admit the air to the cylinder and check its exit, but the packing which has been formerly used after such engines had been a short time in use failed to form a perfectly tight contact with the inner surface of the cylinder, and consequently did not prevent the leakage of the heated air from the cylinder. The present invention however, overcomes any possibility of this character by providing the channels $c$ in the piston $a$ and arranging them to extend to the circumferential channel from the side of the piston $a$ opposed to the action of the pressure fluid so that the latter can pass through them to the circumferential channel $b$ and press against the back of the packing $f$ to increase the pressure against the inner surface of the cylinder so that a perfectly tight contact will be established therewith. It is possible to employ the same style of packing for pump and other purposes, and for that reason it is not desired to confine the use of the invention to any particular purpose.

Having thus fully described my invention, what I claim as new and desire to secure by Letters Patent is:—

1. A piston having an unoccupied peripheral channel communicating with the pressure side of the piston, and a packing secured at one edge to the piston to overhang said channel, and having its other edge free to be pressed outwards from the piston by the pressure fluid within the said channel.

2. A piston having an unoccupied circumferential channel in its peripheral surface, a duct in the piston leading from the circumferential channel to the pressure side of the piston and a packing secured at one edge to the piston to overhang the circumferential channel, and having its other edge free to be pressed outwards from the piston by the pressure fluid entering the circumferential channel through the said duct.

3. A piston having an unoccupied circumferential channel in its peripheral surface, a series of ducts formed through the piston from the pressure side thereof and communicating with the circumferential channel, a packing secured at one edge to the piston to overhang the circumferential channel, and having its other edge free to be pressed outward from the piston by the pressure fluid entering the circumferential channel through the said ducts.

Toronto, August 16th A. D. 1907.

MARTIN J. QUINN.

Signed in the presence of—
CHAS. H. RICHES,
OLIVE A. BATEMAN.